United States Patent Office

2,908,593
ELECTRICAL CAPACITORS
Edward S. Naidus, Salem, Mass.

No Drawing. Application April 17, 1952
Serial No. 282,889

6 Claims. (Cl. 117—201)

This invention relates to improvements in and relating to electrical capacitors or condensers, and more particularly to a new dielectric material for such capacitors. It also includes compositions of matter from which the new dielectric material can be readily made, and finally to a method of forming new and improved capacitors therefrom.

Electrical capacitors comprise positive and negative metal conducting plates or foils separated from each other by suitable dielectrics, such as air, paper, mica and similar non-conducting substances. The capacitance of a capacitor is directly proportional to the surface area of the conducting plates and to the dielectric constant of the dielectric material employed. It is inversely proportional to the thickness of the dielectric which separates the positive and negative conductors. This is clearly shown by the following classical formula for the capacitance of a parallel plate capacitor:

$$C = \frac{(8.8)k.A}{10.^{14}d} \text{ farads}$$

wherein $C$ is the capacitance in farads, $k$ the dielectric constant of the dielectric material used, $A$ the total surface area in sq. cm. of the dielectric material or of the conducting plates in contact with the dielectric, and $d$ is the thickness of the dielectric in cm.

It follows from this, and it is of course well known in the art, that, theoretically, the thinner the dielectric and the higher the dielectric constant is, the greater is the capacitance and, hence, the utility of a condenser. Usually, however, these two properties are mutually exclusive in a practical sense, since the breakdown voltage of a capacitor increases with increase in thickness of the dielectric spacing material, and leakage losses likewise decrease with increased thickness of the dielectric. Paper dielectric spacers, while in common use, are limited by the relatively low dielectric constant (2 to 3) for paper. Furthermore, paper invariably has microscopic pinholes in it, giving rise to leakage and requires two or three layers to be used as the dielectric between the conducting plates.

Electrolytic capacitors have the great advantage of using molecularly thin dilelectric oxide coatings around the positive pole, but they are limited to use with direct current. So-called ceramic condensers have a relatively thick ceramic dielectric spacer which has a high dielectric constant.

The object of the present invention is to provide an electrical capacitor with a very thin dielectric composed at least in part of titania. The dielectric constant of the mineral rutile which consists of titania is exceedingly high, namely, about 170 along the crystal axis and about 85 at right angles to that axis.

A further object of this invention is to provide capacitors which contain a dielectric composed at least in part of titania, which may be of miniature size for a given rating.

In accordance with the invention, I provide conducting surfaces with tightly adherent, high-temperature resistant, thin, insulating coatings comprising titania, which coatings have a very high dielectric constant and a low-power factor, and from which coated conducting surfaces improved electrical capacitors are formed to provide capacitors of exceptionally high capacitances. By this invention I provide an improved type of capacitor which may be used in place of electrolytic capacitors. Both stacked plate and rolled capacitors may be made in accordance with this invention, since the insulating coatings provided are sufficiently flexible as well as being extremely thin to enable metallic conducting surfaces coated therewith to be rolled into extremely small convolutely wound capacitors.

The invention also includes the coating compositions employed for forming the insulating coatings and the method of coating conducting surfaces with this new type of dielectric.

In the course of my researches into this subject, I have discovered that tightly adherent extremely thin coatings of remarkably high dielectric properties can be formed on metal surfaces by applying thereto dilute solutions of organo titanates in suitable volatile organic solvents, followed by flash-drying of the solvent and subsequent baking or heating of the residual formed coating until it is hard and non-tacky.

I believe that when a dilute solution in an organic solvent of an organo titanate is applied to a metallic surface and ultimately baked, some decomposition, and possibly some polymerization of the organo titanate takes place to deposit a thin continuous layer of titania onto the metallic surface. Any organic titanate which is soluble in a volatile organic solvent may be used in the practice of this invention. The function of the organic radical in the organo titanate is to permit the formation of a molecular dispersion of titania, and thus to provide a means for coating conducting surfaces with a thin layer of titania which is free from discontinuities, such as pinholes or cracks. Examples of suitable organic titanates that may be used in the practice of this invention are the alkyl and aryl titanates. More specifically, suitable examples include ethyl titanate, phenyl titanate, tetraallyl titanate and butyl titanate. Further examples of suitable organo titanates for use in the practice of this invention include the following: tetra-ethoxy titanate, propoxy titanate, i-propoxy titanate, butoxy titanate, i-butoxy titanate, sec-butoxy titanate, tert-butoxy titanate, octanoxy titanate, phenoxy titanate, cresoxy titanate, xylenoxy titanate, naphthoxy titanate, allyloxy titanate, vinyloxy titanate, glycoloxy titanate, alkyl-etheroxy titanate, aryl-etheroxy titanate and pentaerythritoxy titanate.

Combinations of any one or more of the specified organo titanates can be used.

It is desirable to introduce a very small amount of a polyhydroxy compound into the reaction mixture from which the organo titanates are prepared in the first place. The amount of polyhydroxy compound thus introduced may be from 0.001% to 1.0%, based upon the weight of the titanium, suitably specific polyhydroxy compounds being the glycols, the epoxy alkanes and glycerol. Small amounts of these compounds modify the organo titanate produced to yield desirable high-boiling polymer-like fractions that are more soluble in organic solvents and less hydrolyzable.

In addition to using organo titanates or titanium esters, which have been modified by the presence of the stated minute amounts of the polyhydroxy compounds, it will be understood that some of the organo titanates are in any case polymerizable. For example, tetraallyl titanate can be polymerized, and it can also be co-polymerized with other polymerizable materials, such as polychlorstyrene, to form homogeneous copolymers having film-like properties and high dielectric constants. This is important, because, while satisfactory coatings in accordance with this invention can readily be formed on flat metallic plates from dilute solutions or dispersions of, say, ethyl titanate in an alcohol-xylol mixture, without the presence in the solution of any other film-forming substances, the resulting films are relatively brittle and are not suitable for coating foil which is to be concentrically wound to form rolled capacitors. When the metal foil carrying the new dielectric coating of this invention is to be used to form rolled capacitors, it is desirable to impart flexibility to the coating beyond that which it normally possesses by including in it a film-forming binder, which is capable of yielding a flexible, high-temperature resistant and relatively high dielectric constant film.

Suitable binders for this purpose are the so-called silicone resins, such as the aryl alkyl silicones, which have an alkyl:aryl ratio between 0.4 and 0.5, and a CH:Si ratio of 1.4 to 2.0. Methylphenyl silicones have the best thermal and dielectric properties, but other aryl and alkyl groups may be present for the purpose of obtaining any desired balance of flexibility and strength. The polyaryl alkyl silicones which may be used are employed in partially polymerized form. The silicones become more fully polymerized when the coating composition containing them is baked and result in films which do not melt at 100° C., nor even at 200° C., and they yet remain flexible.

In addition to the silicone resins referred to, other suitable film-forming binders for use in the practice of the present invention include polyarylalkyl silicones, polyvinyl carbazole, polychlorostyrene, polysilicate esters, polyacrylate esters, polymethacrylate esters, polyallyl phthalate, poly ($F_2C=CFCl$), polydivinyl benzene, polydimethyl acetylene, polyvinyl phthalimide, polybutene, polyethylene and polystyrene.

The class of binders referred to generally have a maximum power factor of 5%, and they also have relatively high dielectric constants. They form compatible mixtures with the organo titanates in the presence of volatile solvents, such as isopropanol, xylol, etc. As stated, the binders used are blended in the coating compositions of this invention in their unpolymerized or partially polymerized liquid state, in which they are customarily marketed, and they polymerize or co-polymerize, depending upon the nature of the titanate with which they are compounded, to yield heat-resistant, flexible films of attractive electrical properties.

Suitable solvents in use in the practice of this invention include the relatively low-boiling common organic solvents, such as ethanol, propanol, isopropanol, butanol, isobutanol, benzene, toluene, xylene, cyclohexane, methylcyclohexane, tetralin and hexalin, as well as mixtures of any two or more of these solvents.

The electrical properties of capacitors comprising a dielectric composed of titania and a binder of the kind referred to have excellent characteristics, but still better electrical properties are achieved when there is included in the coating composition a very finely divided filler having a high-dielectric constant, such as an alkaline earth titanate or titania in the form of rutile. Barium zirconate is also good for this purpose. The effect of the finely divided inorganic filler is to prevent the presence of pinhole imperfections in the coating. Thus in general, the inclusion of a binder decreases the tendency of the film to craze or crack, while the inclusion of inorganic filler fills up any pinholes in the coating.

Thus, by blending finely divided inorganic materials such as rutile with an organo titanate such as ethyl titanate, and a binder such as a silicone resin, in a volatile solvent such as xylol, there is provided a coating composition from which extremely thin tightly adherent coatings can be formed, and from which capacitors of remarkably high capacitance can be constructed.

The preferred coatings made in accordance with this invention have a thickness of from 0.5 to 1.0 mil. Any high conducting surface can be so coated, especially metallic surfaces, such as those composed of the following metals or of their alloys: aluminum, zinc, magnesium, silver, copper and steel.

The specific purposes of the various components of the compositions employed in the practice of this invention may be varied over such ranges as to indicate that these relative proportions are without material significance. Thus, variations in the relative proportions of any of the components in the coating composition results in a variation of the physical or electrical properties of the film as a function of the amount of such component that may be present in the coating composition. Thus, an increase in the amount of an inorganic filler increases the power factor of the dielectric constant, but it decreases the mechanical strength and flexibility of the coating. Increases in the amount of the binder increases the flexibility and decreases the dielectric constant, but the power factor remains relatively unchanged. For most practical purposes, a suitable range of proportions of components in the film is as follows: from 10% to 60% of organo titanate based on the $TiO_2$ content, from 30% to 50% of binder, and not less than half the amount of filler, when a filler is present, and from 1% to 40% of filler. A convenient proportion of volatile organic solvent to employ is a proportion, say, from one to 100 times the amount of organo titanate.

The coating compositions of this invention are generally made up by dissolving the organic titanate in the volatile solvent, and similarly dissolving the binder therein, and then grinding the insoluble inorganic filler into the mixture to form a smooth composition. In some instances, the use of mixed solvents is necessary to effect compatible compositions. Thus, for example, the ethyl titanate and the methyl phenyl silicone of the type indicated above is best mixed in a solvent mixture of xylol and isopropanol. Of the fillers, barium titanate is preferred, because it has the highest inherent dielectric constant and is outstanding in this respect among the alkaline earth titanates. Strontium titanate, calcium titanate and barium-strontium titanate can, however, be also very successfully used in the practice of this invention.

In the practice of this invention, the coating composition is applied to the metal or other conducting surfaces by any of the standard methods of application, namely, by spraying, brushing, dipping, spin-coating and rollcoating. Thus, long lengths of aluminum or other metal foil can be treated by spraying the composition thereon. After the more volatile material has been evaporated off at room temperature, the coated metal is baked or otherwise heated to 150° C. to 300° C. for from 30 minutes to two hours, preferably in two stages, the first at around or slightly more than 100° C. for an hour or more, and the second at around 300° C. for from half an hour to an hour. This heat treatment can be a simple baking operation in an oven, or, if desired, electronic heating can be used. The heat treatment volatilizes the solvents and polymerizes the binder, possibly decomposes the organo titanate, to leave a layer of high dielectric constant material on the surface to which it has been applied.

Before being baked, the metal foil or plates so treated can be assembled to form a condenser assembly, and the assembly as a whole then baked. The plates or foils may be so arranged that the resultant assembly has uncoated outer conducting surfaces, or, alternately, the outer surfaces may also be coated with the insulation and then, after the baking treatment, they may be overcoated with a conducting layer of metal, such as aluminum or zinc, which can be deposited thereon in any suitable way, as by high vacuo evaporation of the metal or by sputtering it. In any case, electrical leads are subsequently attached to the outer conducting surfaces, and the resulting condenser is packaged for use. The condenser stack may be encased in a phenol-formaldehyde resin through which the leads pass. In the form of rolled capacitors, the central hollow core may be filled with a suitable dielectric oil, in accordance with standard capacitor practices.

In the following examples the proportions given are by weight except when otherwise stated:

Example 1

A clean composition of the following kind is prepared:

| | | |
|---|---|---|
| Ethyl titanate | g | 1 |
| Isopropanol | cc | 5 |
| Xylol | cc | 75 |

This mixture is sprayed on to clean aluminum foil and the solvent allowed to evaporate. It is then baked in an oven for 3 hours at 300° C., again sprayed with the composition and rebaked.

The coating adheres firmly to the flat foil and condensers made up from it have the following electrical characteristics:

Resistance—greater than $10^9$ ohms.
Capacitance—0.3 microfarads per sq. cm.
Power factor—1%

The coating formed is strongly adherent, very smooth and hard.

Example 2

| | Parts |
|---|---|
| Ethyl titanate | 10 |
| Isopropanol | 10 |
| Xylol | 10 |

This composition was applied as in Example 1 and the coating obtained on aluminum foil had the following properties:

Resistance—above $10^{13}$ ohms
Dielectric constant—above 20
Power factor—below 0.005
Breakdown voltage—above 500 volts

Example 3

| | Parts |
|---|---|
| Phenyl titanate | 10 |
| Isopropanol | 10 |
| Xylol | 10 |

Electrical properties as in Example 1.

Example 4

| | Parts |
|---|---|
| Butyl titanate | 10 |
| Isopropanol | 10 |
| Xylol | 10 |

Electrical properties as in Example 1.

The films formed of these compositions of Examples 1-4, by spraying them on to aluminum foil and baking were clear, continuous and somewhat brittle, but nevertheless very suitable for use in stacked plate or flat capacitors.

In the following Example 5: a binder is included in the composition. The binder is defined as a silicone varnish, and it consists of a solution in xylol of a polymethyl-phenyl silicone which may be prepared for example in accordance with Example 2 of U.S. Patent 2,516,047 to De Coste.

Example 5

A composition of the following constitution was prepared:

| | Parts |
|---|---|
| Ethyl titanate | 10 |
| Polymethylphenyl silicone varnish | 10 |
| Isopropanol | 10 |
| Xylol | 10 |

The solution so prepared was applied to aluminum foil in accordance with the procedure set forth in Example 1. Condensers made up from the coated foil had the following electrical properties:

Resistance—above $10^{13}$ ohms
Dielectric constant—above 10
Power factor—below 0.005
Breakdown voltage—above 700 volts The film obtained from this composition was flexible and tough.

In the following Examples 6–8, an inorganic filler in finely divided form is included in the coating composition.

Example 6

In this example a composition of the following constitution was prepared:

| | Parts |
|---|---|
| Barium titanate | 20 |
| Polymethylphenyl silicone varnish | 10 |
| Xylol | 10 |
| Ethyl titanate | 1 |

This mixture is ground to a smooth consistency and then sprayed or dipped onto aluminum foil. After air drying it is baked at 115° C. for 1 to 4 hours, and then at 300° C. for 0.5 to 1 hour. Coated foil so made can be assembled with aluminum foil, tin foil or steel plates, preferably before baking at 300° C., and then after baking made up into a condenser with a graphite counter electrode. Two one-sided coated foils can be assembled face to face and caused to adhere by passing them through squeeze rolls, since the coating is tacky before it is baked.

Condensers so constructed have a resistance of greater than $10^9$ ohms, a capacitance of 3 microfarads per sq. cm., a power factor of less than 2% and a breakdown strength of 800 to 1000 volts per mil.

Example 7

| | Parts |
|---|---|
| Butyl titanate | 10 |
| Titania (rutile) | 10 |
| Polymethylphenyl silicone varnish | 10 |
| Isopropanol | 10 |
| Xylol | 10 |

This composition was applied to aluminum as in Example 6.

The electrical properties of film obtained are:

Resistance—above $10^{13}$ ohms
Dielectric constant—above 25
Power factor—below 0.003
Breakdown voltage—above 1000 volts

Example 8

| | Parts |
|---|---|
| Ethyl titanate | 10 |
| Barium titanate | 10 |
| Isopropanol | 10 |
| Xylol | 10 |
| Polymethylphenyl silicone varnish | 10 |

This composition was applied to aluminum as in Example 6.

This yields a film having the following properties:

Resistance—above $10^{13}$ ohms
Dielectric constant—above 35
Power factor—below 0.02
Breakdown voltage—above 500 volts These films are white, opaque, continuous and flexible.

The substitution of polyvinylcarbazole resin for the polymethylphenyl silicones in the above Examples 6–8 give similar results.

Silicone varnishes at present on the market and consisting of arylalkyl silicones in partially polymerized form and in solution in organic solvents may be used in place of the specific varnishes referred to in the preceding examples. For example, Dow Corning resin 993 may be used. According to U.S. Patent 2,553,362 to Dannenberg, this resin is a phenylethyl polysiloxane having a phenyl: ethyl: silicone mole ratio of about 0.77:0.43:1. In general, any of the standard aryl-alkyl silicone varnishes on the market are suitable for use in the practice of this invention.

It will be noted that in Example 1, two coatings of the dispersion of organo titanate are applied to the aluminum foil. This is advantageous and provides a stronger coating which is free from pinholes and other discontinuities.

It is important, as will be well appreciated by those skilled in the coating arts, to take all precautions against contamination of the coating solution with extraneous dust or other impurities, and for these reasons it is advisable to effect the coating operation under substantial dust-free conditions. The ability to exclude all conducting particles from the coating solution enables dielectric films to be formed which exhibit minimum leakage losses.

A remarkable property of the films formed on conducting surfaces by this invention is the hardness and extraordinary tenacity with which they adhere to the conducting surfaces.

In general, capacitors made in accordance with this invention have capacitances of from 12 to 20 times those of paper capacitors of comparable plate sizes at present on the market, and from 2 to 4 times those of present day comparative electrolytic capacitors. The invention, therefore, provides a new type of electrical capacitor which has remarkably high efficiency and can be produced at very low cost and in extremely small sizes.

This application is a continuation-in-part of U.S. application Ser. No. 749,348, filed by applicant on May 20, 1947, now abandoned.

I claim:

1. A method of providing the surfaces of the metal electrodes of electrical capacitors with adherent dielectric coatings including molecularly dispersed titania, which comprises the steps of applying to a surface of the electrode a solution of an organo titanate which is hydrolyzable on contact with atmospheric moisture, in a volatile organic solvent, evaporating off the solvent at room temperature in atmospheric air of normal moisture content to at least initiate partial hydrolysis of the organo titanate, and heating the residue at approximately 300° C. for at least one-half hour in air.

2. A method as in claim 1; wherein said solution further contains an alkaline earth titanate dispersed therein and a synthetic resinous film-forming material compatible with said organo titanate and capable of forming flexible films of high melting point and relatively high dielectric constant.

3. A method as in claim 2; wherein said synthetic resinous film-forming material is a soluble silicone resin.

4. A method as in claim 2; wherein said solution further contains a finely divided inorganic filter of high dielectric constant dispersed therein.

5. A method as in claim 1; wherein said organo titanate is ethyl titanate.

6. A method as in claim 5; wherein said solution further contains a soluble silicone resin.

References Cited in the file of this patent

UNITED STATES PATENTS

| | | |
|---|---|---|
| 661,610 | Kellner | Nov. 13, 1900 |
| 1,735,080 | Hertz | Nov. 12, 1929 |
| 1,739,044 | Ruben | Dec. 10, 1929 |
| 1,818,196 | Cooper et al. | Aug. 11, 1931 |
| 1,846,844 | Clark | Feb. 23, 1932 |
| 2,058,844 | Vaughn | Oct. 27, 1936 |
| 2,229,431 | Young | Jan. 21, 1941 |
| 2,384,541 | Fruth | Sept. 11, 1945 |
| 2,394,670 | Detrick | Feb. 12, 1946 |
| 2,421,652 | Robinson | June 3, 1947 |
| 2,486,955 | Langwill | Nov. 1, 1949 |
| 2,494,920 | Warrick | Jan. 17, 1950 |
| 2,504,178 | Burnham | Apr. 18, 1950 |
| 2,512,058 | Gulledge | June 20, 1950 |
| 2,566,363 | Pedlow et al. | Sept. 4, 1951 |
| 2,585,197 | Walton | Feb. 12, 1952 |
| 2,590,650 | Robinson | Mar. 25, 1952 |
| 2,709,174 | Rust | May 24, 1955 |

FOREIGN PATENTS

| | | |
|---|---|---|
| 396,453 | Great Britain | Aug. 10, 1933 |
| 125,450 | Australia | Sept. 25, 1947 |